United States Patent Office 3,507,833
Patented Apr. 21, 1970

3,507,833
STABILIZED POLYAMIDE COMPOSITION CONTAINING COPPER AND HALOGENATED PHOSPHITE ADDITIVES
Joachim Nentwig, Krefeld-Bockum, Germany, Peter Popper, Tokyo, Japan, and Hans Rudolph and Karl Heinz Hermann, Krefeld-Bockum, Germany, assignors to Farbenfabriken Bayer Aktiengesellschaft, Leverkusen, Germany, a corporation of Germany
No Drawing. Filed Mar. 3, 1967, Ser. No. 620,249
Claims priority, application Germany, Mar. 10, 1966, F 48,630
Int. Cl. C08g 51/62
U.S. Cl. 260—45.75        11 Claims

ABSTRACT OF THE DISCLOSURE

A polyamide composition stabilized against degradation effects of heat and oxygen, comprising a linear polyamide having recurring carbonamide groups in the polymer chain, a copper compound, and a halogen-containing aliphatic phosphite.

---

The present invention relates to a process for the preparation of stabilised polyamides using copper compounds as stabilisers.

Shaped articles such as filaments, bristles, foils etc. made of polyamide which have been prepared by polymerisation of diamines and dicarboxylic acids, or of aminocarboxylic acids or their lactams suffer a reduction in their relative viscosities and an impairment of their mechanical and elongation properties when subjected to the action of air or oxygen, especially at elevated temperatures.

It is already known that polyamides may be protected against the damaging effects of air and oxygen at elevated temperatures by the addition of stabilisers. Examples of compounds which have already been proposed for use as stabilisers are as follows:

Manganese salts of inorganic and organic acid, copper salts of inorganic and organic acids, derivatives of oxy acids of phosphorus, aromatic amines and phenols. Combinations of these groups of compounds with each other or with compounds which do not on their own have any stabilising effect, e.g. alkali metal halides, alkaline earth halides, iodine, aryl sulphonic acids, etc., have been found to be preferable.

The stabilisers hitherto used have the disadvantage that either their stabilising effect is not sufficient, as in the case e.g. of manganese salts, phosphorus compounds and phenols, or that they are sensitive to light, e.g. aromatic amines and phenols, and therefore cause discoloration especially if added to the polyamide-forming starting mixture before polymerisation. The combination of copper salts with aromatic phosphites is also known to cause strong discoloration in polyamides, regardless of whether the stabiliser is admixed with polyamide before, during or after polymerisation. Although the tendency to cause discoloration is not so pronounced in the also known combinations of copper salts and aliphatic phosphites which are free from halogen, e.g. methyl-, butyl-, octyl- and decylphosphite, it is nevertheless quite substantial, especially under conditions which include prolonged exposure to heat with free access of air or oxygen.

It has now been found that polyamides which undergo less discoloration on exposure to heat in the presence of air or oxygen and mhich, at the same time, are more highly stabilised, are obtained by using as stabiliser a combination of a copper compound with an aliphatic phosphite which contains one or more halogen atoms. The following are examples of such phosphites:

$P(OC_2H_4Cl)(OH)_2$, $P(CHI=CICH_2O)_2(OH)$ $P(OC_2H_4Cl)_2(OH)$, $P(OC_2H_5)_2(OCH_2CH_2Cl)$ $P(OC_2H_5)(OC_2H_4Cl)_2$, $P(OC_2H_4Cl)_3$, $P(OC_2H_4Br)_3$ $P(OCH_2CCl_3)_3$

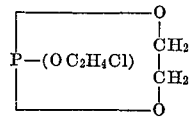

Suitable copper compounds are the salts of monovalent or divalent copper with inorganic or organic acids, monofunctional or polyfunctional phenols or complex compounds of copper salts with ammonia, amines, amides, lactams, cyanides, phosphines etc. It is preferred that the cuprous and cupric salts of hydrohalic acids or hydrocyanic acid, or the copper salts of aliphatic carboxylic acids, e.g. cuprous chloride, cuprous bromide, cuprous iodide, cuprous cyanide, cupric chloride, cupric acetate, cupric stearate, be used. The combinations of copper compounds/phosphites are generally added in quantities of 0.001 to 5.0, preferably 0.01 to 2.0% by weight based on the polyamide, and the combinations may consist of 5 to 95% of copper compounds and accordingly 95 to 5% of the halogen-containing aliphatic phosphites. The copper salts are preferably added in such a quantity that the polyamide contains 0.0001 to 0.1 and preferably 0.001 to 0.02% by weight of copper, and the phosphorus compounds are then added in such quantity that the polyamide contains 0.001 to 0.1 and preferably 0.001 to 0.05% by weight of phosphorus.

The combinations of copper salts and phosphorus compounds used are either mixtures of the components, or stable addition compounds formed between the halogen-containing aliphatic phosphites and cuprous compounds, of the formula CuX, in which X denotes chlorine, bromine, iodine or cyanogen, CuCl.trichloroethylphosphite, CuI3 trichloroethylphosphite, CuBr.tribromoethylphosphite etc. are examples of such addition compounds obtainable from the components, in some cases at elevated temperature.

The stabilising effect may, if desired, be increased by the further addition of iodine compounds such as iodides or polyiodides of alkali metals or alkaline earth metals, or substituted or unsubstituted ammonium iodides and ammonium polyiodides, especially to the addition compounds from the cuprous halogenide and the phosphite compound. The iodine compound may be added in amounts of 0.01 to 0.5% by weight based on the total weight of the polyamide composition.

The stabiliser combination may be added to the polyamide-forming starting mixture before polymerisation is carried out and polymerisation may then be carried out in known manner, either continuously or batchwise. On the other hand, the stabilisers according to the invention, may be mixed with the polyamide melt during or after polymerisation either together or separately or if desired in the form of a concentrate in polyamide, in which case known mixing devices such as extruders, kneaders, stirrers, etc. may be used.

In addition to the stabilisers, the polyamides may contain the usual additives such as pigments, dyes, light stabilisers, fillers such as glass fibres, lubricants and mould parting agents, crystallisation promoters etc.

The polyamides stabilised according to the invention, in particular against damage by oxidation at elevated temperatures are paritcularly suitable for use in the production of artificial silk for fishing nets, drive belts, conveyor belts etc., tyre cords and moulded articles which are exposed to thermal stress within the presence of air or oxygen.

The following examples illustrate more specifically the invention.

EXAMPLE 1

1 kg. of a colourless polycaprolactam of relative viscosity 3.12 (measured in a 1% by weight solution in m-cresol at 25° C. in an Ubbelohde viscosimeter) prepared by the usual method is melted in a conventional screw press and mixed homogenously with various stabiliser combinations. In addition, 3 g. (0.3%) of a commercial cadmium sulphide pigment (Cadmopur GG) are added to Nos. 7 and 14. The polycaprolactam containing the stabiliser is then spun by the usual method as a bristle of about 3 mm. diameter, chopped to a granulate and dried.

The granulate is stored in a drying cupboard at 150° C. with free access of air and its relative viscosity is measured after 144, 500 and 1000 hours.

In addition, the degree of discolouration of the samples is estimated after 144 hours by comparing it with a colour scale ranging from 1 (slightly yellowish) to 7 (dark red brown).

The results of the tests are shown in the table in which tests 8 to 16 represent comparison tests.

(b) one or more halogen conatining aliphatic phosphite wherein the halogen is chlorine, bromine or iodine, the weight ratio of said copper compound to said phosphite compound being from 1 to 19 to 19 to 1.

2. The polyamide composition of claim 1, wherein said copper compound is a copper iodide.

3. The polyamide composition of claim 1, wherein said copper compound is potassium copper cyanide.

4. The polyamide composition of claim 1, wherein said halogen-containing aliphatic phosphite is trichloroethyl phosphite.

5. The polyamide composition of claim 1, wherein said halogen-containing aliphatic phosphite is dichloroethyl phosphite.

6. A polyamide composition of a linear polyamide having recurring carbonamide groups in the polymer chain, stabilized against degradation effects of heat and oxygen, containing 0.001 to 5% by weight based on the total weight of the polyamide composition of an addition compound from a halogen-containing aliphatic phosphite selected from the group consisting of a chlorine-containing, a bromine-containing, and an iodine-containing aliphatic phosphite, and a cuprous halogenide selected from the group consisting of cuprous chloride and cuprous iodide, said addition compound containing 1–3 moles of sail halogen-containing aliphatic phosphite per mole of said cuprous halogenide.

7. The polyamide composition of claim 6, wherein said addition compound is the addition compound of 1 mole of cuprous chloride and 1 mole of trichloroethyl phosphite.

8. The polyamide composition of claim 6, wherein said addition compound is the addition compound of 1 mole of cuprous chloride and 3 moles of trichloroethyl phosphite.

9. The polyamide composition of claim 6, wherein said addition compound is the addition compound of 1 mole of cuprous iodide and 3 moles of trichloroethyl phosphite.

10. A polyamide composition of a linear polyamide having recurring carbonamide groups in the polymer

| Serial No. | Additives | | | | | Percent Cu in polyamide | Percent P in polyamide | Colour after 144 hours | Relative viscosity, hours | | | |
|---|---|---|---|---|---|---|---|---|---|---|---|---|
| | KI | | | P-compound | | | | | | | | |
| | Grams | Percent | Cu compound | Grams | Grams | | | | Initial | After 144 | After 500 | After 1,000 |
| 1 | | | Cu(I) Cl.1 TCEP | 0.95 | | 0.012 | 0.006 | 3 | 3.20 | 3.66 | 2.95 | 2.77 |
| 2 | 5.0 | 0.5 | Cu(I) Cl.1 TCEP | 0.95 | | 0.012 | 0.006 | 3 | 3.19 | 4.37 | 3.80 | 3.60 |
| 3 | 2.0 | 0.2 | Cu(I) Cl.3 TCEP | 1.71 | | 0.012 | 0.018 | 2–3 | 3.25 | 4.25 | 3.80 | 3.65 |
| 4 | 2.0 | 0.2 | Cu(I)I.3 TCEP | 1.89 | | 0.012 | 0.018 | 2–3 | 3.23 | 4.18 | 3.86 | 3.53 |
| 5 | | | Cu(I)I | 0.36 | DCEP 0.73 | 0.012 | 0.011 | 3 | 3.24 | 4.06 | 3.46 | 2.97 |
| 6 | | | Cu(II)Cl₂ | 0.25 | DCEP 0.73 | 0.012 | 0.011 | 3 | 3.26 | 4.12 | 3.36 | 2.92 |
| 7 | | | K₃Cu(CN)₄ | 0.54 | TCEP 0.48 | 0.012 | 0.0055 | 2–3 | 3.18 | 3.82 | 3.37 | 2.94 |
| 8 | | | Cu(I) Cl.1 TDP | 1.61 | | 0.012 | 0.006 | 4–5 | 3.18 | 3.54 | 2.71 | 2.57 |
| 9 | 5.0 | 0.5 | Cu(I) Cl.1 TDP | 1.61 | | 0.012 | 0.006 | 4 | 3.16 | 3.95 | 3.52 | 3.00 |
| 10 | 2.0 | 0.2 | Cu(I) Cl.3 TDP | 3.03 | | 0.012 | 0.018 | 3–4 | 3.18 | 4.09 | 3.69 | 3.28 |
| 11 | 2.0 | 0.2 | Cu(I)I.3 TDP | 3.21 | | 0.012 | 0.018 | 3–4 | 3.19 | 4.13 | 3.67 | 3.30 |
| 12 | | | Cu(I)I | 0.36 | DOP 1.08 | 0.012 | 0.011 | 4–5 | 3.24 | 4.02 | 3.32 | 2.82 |
| 13 | | | Cu(II)Cl₂ | 0.25 | DOP 1.08 | 0.012 | 0.011 | 4 | 3.30 | 4.00 | 3.26 | 2.86 |
| 14 | | | K₃Cu(CN)₄ | 0.54 | TDP 0.89 | 0.012 | 0.0055 | 3–4 | 3.21 | 3.42 | 2.75 | 2.51 |
| 15 | | | Cu(I)I | 0.36 | | 0.012 | | 4–5 | 3.21 | 3.91 | 3.26 | 2.78 |
| 16 | | | Cu(II) Cl₂ | 0.25 | | 0.012 | | 4 | 3.09 | 3.35 | 2.98 | 2.72 |

TCEP = trichloroethylphosphite.
DCEP = dichloroethylphosphite.
TDP = tridecylphosphite.
DOP = dioctylphosphite.

What we claim is:

1. A polyamide composition of a linear polyamide having recurring carbonamide groups in the polymer chain, stabilised against degradation effects of heat and oxygen, containing 0.001 to 5% by weight based on the total weight of the polyamide composition of:
 (a) a copper compound selected from the group consisting of a copper salt of a hydrohalic, a hydrocyanic or aliphatic saturated carboxylic acid and of a complex compound of one of said copper salts with a compound selected from the group consisting of a phosphite and a cyanide, and chain, stabilized against degradation effects of heat and oxygen, containing: (a) 0.01 to 0.5% by weight of an iodine compound selected from the group consisting of an alkali metal iodide, an alkali earth metal iodide, and an ammonium iodide, and (b) 0.001 to 5% by weight of an addition compound of a halogen-containing aliphatic phosphite selected from the group consisting of a chlorine-containing, a bromine-containing, and an iodine-containing aliphatic phosphite, and a cuprous halogenide selected from the group consisting of cuprous chloride and cuprous iodide, the percentages being based on the total weight of the polyamide composition, said addition compound containing 1-3 moles of said halogen-containing aliphatic phosphite per mole of said cuprous halogenide.

11. The polyamide composition of claim 10, wherein said iodine compound is potassium iodide.

References Cited
UNITED STATES PATENTS

| | | | |
|---|---|---|---|
| 2,705,227 | 3/1955 | Stamatoff | 260—45.7 |
| 2,996,466 | 8/1961 | Christoffel | 260—45.7 |
| 3,248,597 | 2/1969 | DiKotter et al. | 260—45.75 |

FOREIGN PATENTS 906,893  2/1946  France.

DONALD E. CZAJA, Primary Examiner

P. P. HOKE, Assistant Examiner

U.S. Cl. X.R.

260—18, 37, 45.7, 45.9